No. 850,737. PATENTED APR. 16, 1907.
D. P. DELLINGER.
PLATE LIFTER.
APPLICATION FILED MAR. 13, 1906.
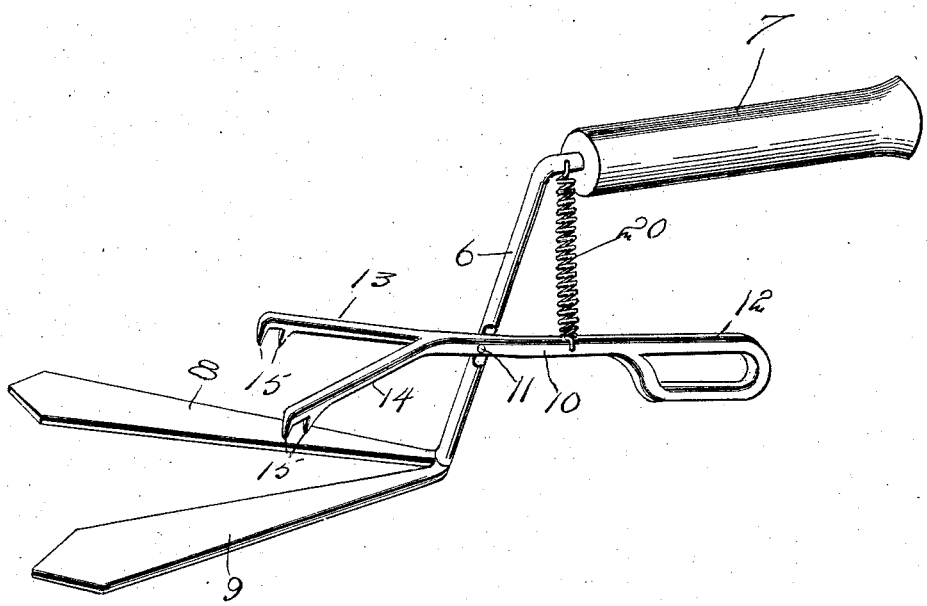

UNITED STATES PATENT OFFICE.

DAVID P. DELLINGER, OF CLEVELAND, NORTH CAROLINA.

PLATE-LIFTER.

No. 850,737.  Specification of Letters Patent.  Patented April 16, 1907.

Application filed March 13, 1906. Serial No. 305,880.

*To all whom it may concern:*

Be it known that I, DAVID P. DELLINGER, a citizen of the United States, residing at Cleveland, in the county of Rowan, State of North Carolina, have invented certain new and useful Improvements in Plate-Lifters; and I do hereby declare the following to be a full, clear, and exact description of the invention, such as will enable others skilled in the art to which it appertains to make and use the same.

This invention relates to devices for manipulating or handling pie or cake pans, and has for its object in general to provide an improved device of that nature and in particular one wherein the supporting area is greatly increased and in which the clamp has likewise an increased clamping area.

Other objects and improvements will be apparent from a consideration of the specification and the drawing forming a part thereof, in which the same elements referred to have the same numerals, and in which there is shown a perspective view of the device.

Referring to said drawing in detail, the device consists of a vertical shank portion 6, provided at its upper end with a handle 7, inclined thereto, and at its lower end with a pair of flat outwardly-divergent members 8 and 9. It will be plain that by the formation of the said members divergent from the shank that a much greater supporting area is obtained than by the use of a single member normally at right angles to the shank or by a single flat circular member.

It is understood that the members 8 and 9 are of sufficient length to extend beyond the center of gravity of the average-sized cake-pan. The said members may be formed integral with the shank 6 or may be formed separate and united thereto in any convenient manner.

Pivoted at about the middle of the shank 6 by a pivot-pin 11 is the clamping-lever 10. This lever is formed with a gripping portion 12 at its inner end, which may be in the form of a loop, through which the middle finger of the operator's hand may be passed, or which may be merely a plain handle. The lever is likewise provided at its outer end with a pair of divergent members 13 and 14. These members are provided at their outer ends with teeth 15, a pair of said teeth being shown on each member. The space between the two teeth may be adapted to receive the beaded rim of the pie-plate, or the teeth may be pressed directly against the inner edge of the plate. It is clear, as in the case of the supporting member, that a much greater clamping area is secured by the formation of the arms 13 and 14 divergent.

In operation the members 8 and 9 are slid under the pan to be moved, and the lever 10 is then moved downward until the teeth 15 contact with the edge of the tin. It is thus seen that by the coöperation of the two pairs of members that the pan is firmly held and can be readily lifted from a range or stove or moved to different positions thereon. The clamping end of the lever 10 is normally held depressed through the medium of a helical spring 20, which is attached to the lever and shank directly adjacent their handle ends.

What is claimed is—

A pan-lifter comprising a vertical shank having an inclined handle at one end and provided at its opposite end with a plurality of flat, outwardly-divergent members adapted to support the under side of a pan, a lever pivoted intermediate its ends to said shank and provided at one end with a handle and at the other with a pair of outwardly-divergent clamping members having their free ends formed with depending teeth adapted to engage the rim of a pan and coöperating with said supporting members to grasp and hold a pan, and a spring connecting said shank and lever adjacent the handles thereof and adapted to hold the clamping end of the lever normally depressed.

In testimony whereof I affix my signature in presence of two witnessess.

DAVID P. DELLINGER.

Witnesses:
W. R. WILKINS,
ED. W. BARNES.